(12) United States Patent
Bui et al.

(10) Patent No.: US 11,797,565 B2
(45) Date of Patent: Oct. 24, 2023

(54) DATA VALIDATION USING ENCODE VALUES

(71) Applicant: PayPal, Inc., San Jose, CA (US)

(72) Inventors: Kim Dung Bui, Singapore (SG); Chun Kiat Ho, Singapore (SG); Lin Song, Singapore (SG); Kai Xie, Singapore (SG)

(73) Assignee: PayPal, Inc., San Jose, CA (US)

( * ) Notice: Subject to any disclaimer, the term of this patent is extended or adjusted under 35 U.S.C. 154(b) by 30 days.

(21) Appl. No.: 16/816,778

(22) Filed: Mar. 12, 2020

(65) Prior Publication Data

US 2021/0200745 A1    Jul. 1, 2021

Related U.S. Application Data

(60) Provisional application No. 62/955,157, filed on Dec. 30, 2019.

(51) Int. Cl.
*G06F 16/27* (2019.01)
*G06F 16/23* (2019.01)
(Continued)

(52) U.S. Cl.
CPC .......... *G06F 16/27* (2019.01); *G06F 11/3409* (2013.01); *G06F 16/215* (2019.01);
(Continued)

(58) Field of Classification Search
CPC ............... G06F 16/2365; G06F 16/215; G06F 11/3409; G06K 9/6256; G06K 9/6265; G06N 3/08
See application file for complete search history.

(56) References Cited

U.S. PATENT DOCUMENTS 10,235,090 B1 *   3/2019   Baruch ............... G06F 11/1471
10,642,715 B1 *   5/2020   Simca ................. G06F 11/3409
(Continued)

OTHER PUBLICATIONS

Breck et al. ("Data Validation for Machine Learning"; Proceedings of the 2nd SysML Conference, Palo Alto, CA, USA, 22019 Copyright 2019 by the author(s)) (Year: 2019).*

(Continued)

*Primary Examiner* — Ken Hoang
(74) *Attorney, Agent, or Firm* — Kowert, Hood, Munyon, Rankin & Goetzel, P.C.; Dean M. Munyon

(57) ABSTRACT

Techniques are disclosed relating to data validation using encode values. In various embodiments, a data monitoring system may retrieve a plurality of datasets from a live database at a non-production datacenter. The data monitoring system may perform encoding operations on one or more of the plurality of datasets to generate encode values that correspond to the plurality of datasets. The data monitoring system may then retrieve an updated dataset, for example from an experimental database at the non-production datacenter, and perform validation operations to validate one or more characteristics of the updated dataset. For example, in some embodiments, the data monitoring system may retrieve the encode values corresponding to the plurality of datasets and use the encode values to validate the updated dataset. The data monitoring system may then generate a validation output indicative of a result of the validation operations.

20 Claims, 11 Drawing Sheets

(51) Int. Cl.
G06F 16/215 (2019.01)
G06F 11/34 (2006.01)
G06N 3/08 (2023.01)
G06F 18/214 (2023.01)
G06F 18/21 (2023.01)

(52) U.S. Cl.
CPC ........ *G06F 16/2365* (2019.01); *G06F 18/214* (2023.01); *G06F 18/2193* (2023.01); *G06N 3/08* (2013.01)

(56) References Cited

U.S. PATENT DOCUMENTS

| | | | |
|---|---|---|---|
| 2004/0049498 | A1 | 3/2004 | Dehlinger et al. |
| 2005/0060643 | A1 | 3/2005 | Glass et al. |
| 2006/0215875 | A1 | 9/2006 | Lecomte et al. |
| 2011/0087669 | A1 | 4/2011 | Ancin et al. |
| 2011/0093426 | A1 | 4/2011 | Hoglund |
| 2013/0262873 | A1 | 10/2013 | Read et al. |
| 2014/0373148 | A1 | 12/2014 | Nelms et al. |
| 2015/0074743 | A1 | 3/2015 | Ilieva et al. |
| 2015/0244795 | A1* | 8/2015 | Cantwell ................ G06F 16/27 709/202 |
| 2016/0078339 | A1 | 3/2016 | Li et al. |
| 2018/0095835 | A1* | 4/2018 | Dubois ............... G06F 11/1448 |
| 2018/0218356 | A1 | 8/2018 | Grassadonia et al. |
| 2018/0338147 | A1 | 11/2018 | Nowozin et al. |
| 2018/0357447 | A1* | 12/2018 | Chen .................... G06F 16/211 |
| 2019/0324861 | A1* | 10/2019 | Stowell .................. H04L 63/12 |
| 2020/0104587 | A1* | 4/2020 | Bhatnagar ............ G06F 40/216 |
| 2020/0402672 | A1* | 12/2020 | Michelson ............. G16H 50/20 |
| 2020/0410322 | A1* | 12/2020 | Naphade ................ G06N 3/08 |

OTHER PUBLICATIONS

Alberto Bartoli et al., "Inference of Regular Expressions for Text Extraction from Examples," IEEE Transactions on Knowledge and Data Engineering, vol. 28, No. 5, May 2016, pp. 1217-1230.

Bo Zong et al., "Deep Autoencoding Gaussian Mixture Model for Unsupervised Anomaly Detection," Published as a conference paper at ICLR 2018, 19 pages.

Pieter-Tjerk de Boer et al., "A Tutorial on the Cross-Entropy Method," Annals of Operations Research, last updated: Sep. 2, 2003, 47 pages.

Apache Avro 1.9.1 Documentation, The Apache Software Foundation, last published Sep. 2, 2019; avro.apache.org/docs/current/; retrieved Dec. 30, 2019, 2 pages.

Developer Guide | Protocol Buffers | Google Developers; https://developers.google.com/protocol-buffers/docs/overview; retrieved Dec. 30, 2019, 5 pages.

Tomas Mikolov et al., "Distributed Representations of Words and Phrases and their Compositionality," https://arxiv.org/abs/1310.4546v1; Oct. 16, 2013, 9 pages.

Encoding | Protocol Buffers | Google Developers; https://developers.google.com/protocol-buffers/docs/encoding#embedded; retrieved Dec. 30, 2019, 6 pages.

Euclidean distance, Wikipedia.com, last edited on Dec. 12, 2019, 3 pages.

Jensen-Shannon divergence, Wikipedia.com, last edited on Nov. 15, 2019, 6 pages.

Regular expression, Wikipedia.com, last edited on Dec. 30, 2019, 27 pages.

Wasserstein metric, Wikipedia.com, last edited on Dec. 19, 2019, 4 pages.

Word embedding, Wikipedia.com, last edited on Dec. 5, 2019, 5 pages.

Blei et al., "Latent Dirichlet Allocation", Journal of Machine Learning Research 3, 2003, 30 pages.

Wikipedia, "Latent Dirichlet Allocation," retrieved from https://en.wikipedia.org/wiki/Latent_Dirichlet_allocation, on Apr. 28, 2020, 8 pages.

Wikipedia, "Nearest neighbor search," https://en.wikipedia.org/w/index.php?title=Nearest_neighbor_search&oldid=925501400; last edited on Nov. 10, 2019, 7 pages.

Goodfellow et al., "Deep Learning—Chapter 14 Autoencoders," https://www.deeplearningbook.org > contents > autoencoders, 2016, pp. 499-523.

S. Kullback et al., "On Information and Sufficiency," The Annals of Mathematical Statistics; Mar. 1951, pp. 79-86.

* cited by examiner

_700_

Validating an update pattern associated with one or more data records in an updated dataset

↓

Encode a historical version of a first dataset to generate update pattern encode values associated with the first dataset, where the updated dataset is an updated version of the first dataset
_702_

↓

Compare the one or more data records in the updated dataset to the update pattern encode values associated with the first dataset
_704_

```
┌─────────────────────────────────────────────────────────────────────┐
│   Validating a value-format of string-type data included in the updated dataset   │
└─────────────────────────────────────────────────────────────────────┘
                                    │
                                    ▼
┌─────────────────────────────────────────────────────────────────────┐
│  Generate one or more regular expressions based on string-type      │
│     data included in at least one of the plurality of datasets      │
│                              902                                     │
└─────────────────────────────────────────────────────────────────────┘
                                    │
                                    ▼
┌─────────────────────────────────────────────────────────────────────┐
│  Parse data in the updated dataset using the one or more regular    │
│                           expressions                                │
│                              904                                     │
└─────────────────────────────────────────────────────────────────────┘
```

*FIG. 9*

DATA VALIDATION USING ENCODE VALUES

This application claims the benefit of U.S. Provisional Application No. 62/955,157, filed on Dec. 30, 2019, which is hereby incorporated by reference as if entirely set forth herein.

BACKGROUND

Technical Field

This disclosure relates generally to data quality and, more particularly, to validating new or updated datasets using encode values generated based on previous datasets.

Description of the Related Art

In providing web services, a server system (e.g., multi-datacenter system) may update various datasets frequently and store these updated datasets at multiple locations. For example, a dataset may be replicated at a database at a production datacenter to serve requests from client devices and to database at a non-production datacenter for use in offline simulations and analytics. The volume of updated data records can be quite high. For example, in some instances, a given dataset may have billions of data records (e.g., 3-5 billion) that are updated on a daily basis. It is important to validate the data in these datasets to ensure data quality and integrity of the services that utilize the data. Due to the scale involved, however, it is infeasible and undesirable to manually inspect each updated data record to ensure data integrity.

BRIEF DESCRIPTION OF THE DRAWINGS

FIG. 7 is a flow diagram illustrating an example method for validating an update pattern associated with one or more data records in an updated dataset, according to some embodiments.

FIG. 9 is a flow diagram illustrating an example method for validating a value-format of string-type data in an updated dataset, according to some embodiments.

DETAILED DESCRIPTION

Figure 1:
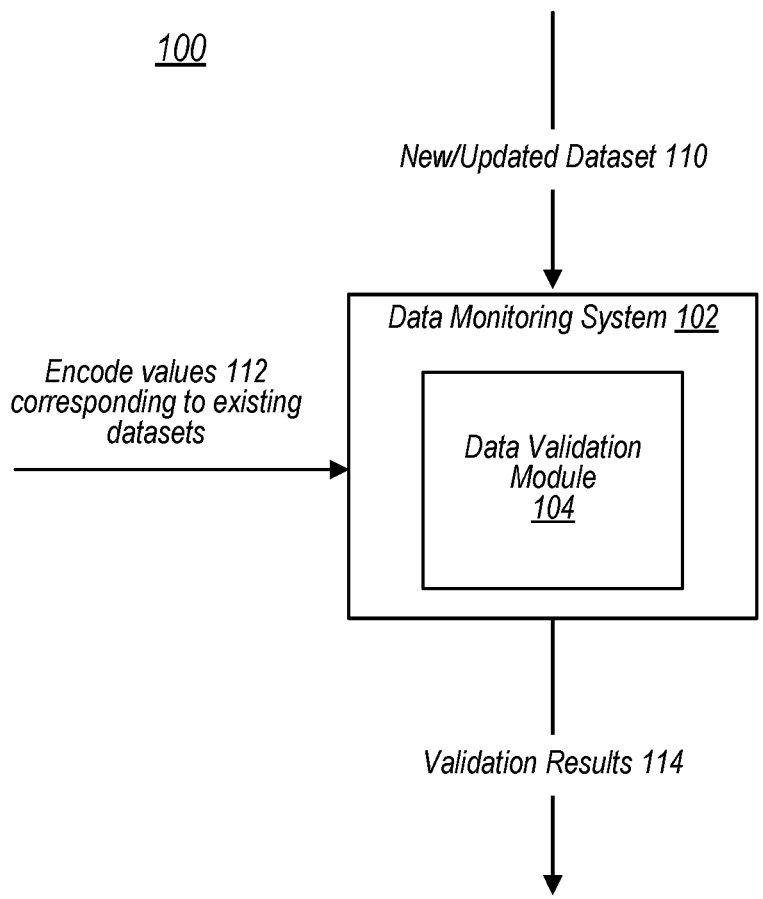
FIG. 1 is a block diagram illustrating an example data monitoring system, according to some embodiments.

To provide web services, a server system (e.g., multi-datacenter system) may update various datasets frequently and store these updated datasets at multiple locations, such as data stores at multiple datacenters. For example, a dataset may be replicated at a database at a production datacenter to serve requests from client devices and to a database at a non-production datacenter for use in simulations and analytics operations. The volume of updated data records can be quite high. For example, in some instances, a given dataset may have billions of data records (e.g., 3-5 billion) that are updated on a daily basis. It is important to validate the data in these datasets, e.g., before it is stored (potentially at multiple datacenters) in the system. Due to the scale involved, however, it is infeasible and undesirable to manually inspect each updated data record to ensure data integrity.

Prior data-monitoring systems suffer from various technical shortcomings. For example, prior data-monitoring systems are only able to detect infrastructure errors, such as data write failures. For example, most prior data monitoring systems rely on technical infrastructure, such as failure rates, package routes, package size, system failures, etc. These systems are not capable, however, of validating the integrity of various characteristics of datasets, such as the semantic content (e.g., the values of actual data records) of data in the datasets to detect inherent abnormalities present in the data records. As one non-limiting example, a data field representing a person's age should not be negative, but such an error can only be detected, in prior data-monitoring systems, using fine-grained data validation rules at the creation of a dataset, and cannot be enforced after data manipulation or transferring. Such problems are further exacerbated in the context of big data in which the number of data records involved is commonly in the billions.

In various embodiments, the disclosed systems and methods solve these and other technical problems by validating new or updated datasets using encode values generated based on previous datasets. For example, in various embodiments, a data monitoring system performs encoding operations on data from a live database at a non-production datacenter. The data in the live database at the non-production datacenter may be, for example, previously validated data or data that is already being used to support operational web service. As a non-limiting example, in some embodiments, the encoding operations may include training one or more autoencoder machine learning models using the data from the live database at the non-production datacenter to generate one or more encode values. These encode values (e.g., trained machine learning models) may then be used to validate the integrity of a new dataset (e.g., an update to an existing dataset) before the new dataset is published to a live database (e.g., a database that is used to serve user requests or support analytical operations). For example, when a new version of a dataset (e.g., an updated dataset that has not yet been validated) is received, the data monitoring system may retrieve (e.g., from a machine learning model repository) and run one or more trained machine learning models on the new version of the dataset. The data monitoring system may use the model results to validate the integrity of the data in the updated dataset. For example, by applying the trained machine learning models to data records from the new dataset, the disclosed data monitoring system can detect abnormal data records and validate the updated dataset. In various embodiments, the disclosed systems and methods improve the speed and efficacy of data monitoring operations by ensuring the data stored in the system is consistent and accurate, which is particularly beneficial in a big data context in which the number of data records involved is commonly in the millions or billions. This, in turn, improves data quality in the system and the performance of the various web services that rely on the accuracy and availability of this data.

Referring now to FIG. 1, a block diagram is depicted of an example system 100 that includes data monitoring system 102 and data validation module 104, according to some embodiments. In various embodiments, data monitoring system 102 is operable to validate new or updated datasets using encode values that are generated based on previous datasets. For example, as noted above, as part of providing web services to various users, datasets may be updated frequently. In various embodiments, it may be desirable to validate the data in these datasets at or near the time that they are updated, before they are stored in live data stores and used to facilitate web services or perform analytical operations. (Note, however, that the present disclosure is not limited to such embodiments and, in various embodiments, the disclosed techniques may be used to validate an updated dataset at any suitable time.)

In FIG. 1, data monitoring system 102 receives and performs validation operations on a dataset 110. In various embodiments, dataset 110 may be an updated version of a dataset that is already maintained by system 100 in which the data monitoring system 102 operates. In other embodiments, however, dataset 110 may be a new dataset for which the system 100 does not already maintain a previous version. In various embodiments, data validation module 104 is operable to perform various validation operations on the dataset 110 using encode values 112 corresponding to previous datasets in the system 100. As used herein, the term "encode value" refers to data that is generated, by data monitoring system 102, based on data from datasets that are (or were) included in or accessible to the system 100. Note that the format or content of the encode values may vary, according to different embodiments. As described in more detail below with reference to FIG. 3, data monitoring system 102 may include various encoder modules that are operable to generate encode values 112 that are usable, by data validation module 104, to validate various characteristics associated with a new or updated dataset 110. In some embodiments, for example, the data monitoring system 102 includes an encoder module that is operable to generate "schema encode values," which the data validation module 104 may use to validate a schema associated with dataset 110. Further, in some embodiments, the data monitoring system 102 includes an encoder module that is operable to generate "update pattern encode values," which the data validation module 104 may use to validate an update pattern associated with one or more data records in dataset 110. In some embodiments, the data monitoring system 102 includes an encoder module that is operable to generate "distribution encode values," which the data validation module 104 may use to validate one or more value distributions associated with data in dataset 110. In some embodiments, the data monitoring system 102 includes an encoder module that is operable to generate "value-format encode values," which the data validation module 104 may use to validate a format of string-type data in dataset 110. Additionally, in some embodiments, the data monitoring system 102 includes an encoder module that is operable to generate "semantic encode values," which the data validation module 104 may use to validate the semantic content of data in dataset 110. In various embodiments, the term "encode value" refers to data that includes at least one of a schema encode value, an update pattern encode value, a distribution encode value, a value-format encode value, or a semantic encode value.

Note that, in some embodiments, an encode value may correspond to one or more latent variables associated with a dataset from which the encode value was generated. For example, in some embodiments, an encode value may include a latent probability distribution of numerical data values in a dataset. In other embodiments, an encode value may include a statistical model built using data from one or more datasets. For example, in some embodiments, an encode value may include a trained machine learning model (such as an autoencoder) that was generated based on data from existing datasets that are (or were) maintained by the system 100. Further, in some embodiments, an encode value may include data generated as part of the process of training a machine learning model, such as a latent space representation of a dataset. For example, in some embodiments, data monitoring system 102 may train one or more autoencoder machine learning models based on existing datasets in the system 100. In some such embodiments, the encode values 112 may include either the trained autoencoders or the latent space representation of the dataset(s) that has a lower dimensionality than the original dataset(s).

In various embodiments, data validation module 104 is operable to generate a validation result 114 indicative of the outcome of the various validation operations. Validation result 114 may be provided to a user (e.g., via data monitoring user interface (UI)) or used to automatically initiate one or more operations (e.g., storing the updated dataset 110 to one or more data stores in response to the dataset 110 passing the validation operations, initiating a corrective action in response to detecting one or more anomalies associated with the dataset 110, etc.)

Figure 2:
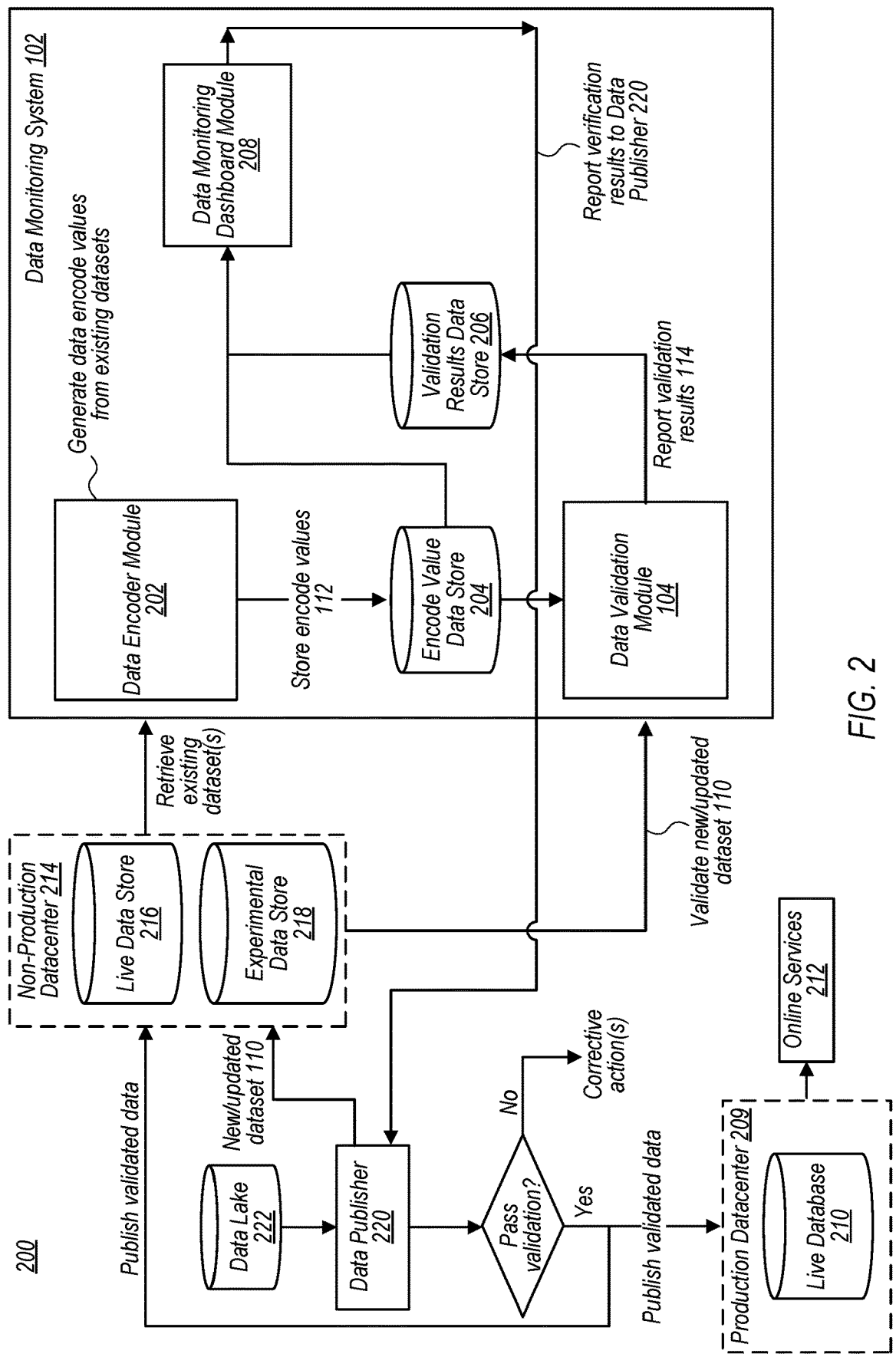
FIG. 2 is a block diagram illustrating an example system that includes a data monitoring system, according to some embodiments.

Turning now to FIG. 2, a block diagram of an example system 200 is depicted, according to some embodiments. FIG. 2 depicts a more detailed diagram of data monitoring system 102, which includes data validation module 104, data encoder module 202, encode value data store 204, validation results data store 206, and data monitoring dashboard module 208, according to some embodiments.

In various embodiments, data monitoring system 102 performs both "offline" operations and "online" operations. In the offline operations, data encoder module 202 may retrieve existing datasets and performs various encoding operations to generate encode values 112. For example, in the embodiment depicted in FIG. 2, data encoder module 202 retrieves existing datasets from the live data store 216 at non-production datacenter 214. Note that, as used herein, the term "non-production" datacenter refers to a datacenter that is used primarily to perform testing, simulations, or other analytical operations. The term "production" datacenter, such as production datacenter 209 of FIG. 2, refers to a datacenter that is used primarily to host software applications and serve online traffic from end users (e.g., users of online services 212). (Note, however, that production datacenters may also be used to perform operations other than servicing online traffic, such as performing analytical operations, and that non-production datacenters may be used to perform operations other than testing and simulations. The terms "production" and "non-production" are simply used herein to denote a significant or common function performed by the respective datacenters.) In various embodiments, the datasets retrieved from the live data store 216 may include data that was previously validated or that is already being used to support online services 212. As such, in various embodiments, the datasets from live data store 216 may be used as a baseline against which to validate new or updated datasets, such as dataset 110, according to various embodiments.

Once it retrieves the datasets from the live data store 216, data encoder module 202 is operable to perform various encoding operations to generate one or more encode values 112, which may be used to validate dataset 110. The encoding operations performed by data encoder module 202 are described in more detail below with reference to FIGS. 3 and 6-10. As one non-limiting example, in some embodiments, data encoder module 202 may use the existing datasets to train a machine learning model, which may subsequently be used by the data validation module 104 to detect anomalous data in dataset 110. For example, in some embodiments, data encoder module 202 may train one or more autoencoder machine learning models, such as the Deep Autoencoding Gaussian Mixture Model (DAGMM). Note, however, that this embodiment is provided merely as one non-limiting example and, in various embodiments, any suitable machine learning model or models may be used. Through these encoding operations, data encoder module 202 is operable to generate various encode values 112, according to various embodiments. As described in more detail below, non-limiting examples of encode values 112 include: trained machine learning models, schema metadata, update pattern information, value distributions, vector word-embedding representations of data in the datasets, regular expressions corresponding to the existing datasets, etc. Once generated, data encoder module 202 may store the encode values 112 in encode value data store 204 for subsequent use by the data validation module 104.

During the "online" operations, data validation module is operable to use the encode values 112 to validate one or more characteristics of dataset 110 (e.g., before it is stored in live data store 210 at the production datacenter 209 or live data store 216 at the non-production datacenter 214). For example, as shown in FIG. 2, system 200 includes data publisher 220, which is operable to publish dataset 110 (e.g., from data lake 222) to experimental data store 218 at the non-production datacenter 214. In various embodiments, dataset 110 may be temporarily stored in experimental data store 218 until it is validated by the data validation module 104. As explained in more detail below, depending on the outcome of these data validation operations by data validation module 104, the dataset 110 may either be stored in the live data stores 210 and 216 (if the dataset 110 passes the validation operations) or one or more corrective actions may be performed (if the dataset 110 does not pass one or more of the validation operations).

Various validation operations performed by data validation module 104 are described in more detail below with reference to FIGS. 4 and 6-10. As a non-limiting example, in some embodiments, data validation module 104 is operable to retrieve dataset 110 from experimental data store 218 (either in a streaming manner (in real-time or near real-time) or in a batch manner at predetermined intervals) and utilize the previously trained machine learning model(s) to detect anomalies with respect to various characteristics of the dataset 110. In various embodiments, data validation module 104 is operable to generate validation results 114 indicative of an outcome of the one or more data validation operations. In various embodiments, data validation module 104 may store the validation results 114 in validation results data store 206.

In FIG. 2, data monitoring system 102 includes data monitoring dashboard module 208, which, in various embodiments, is operable to provide a data monitoring UI that a user may utilize to analyze any flagged problems with the dataset 110 and perform various corrective actions. In various embodiments, the data monitoring dashboard module 208 is operable to provide visualization and reporting of data quality relating to various datasets in the system 200. For example, in various embodiments, the data monitoring dashboard module 208 is operable to provide (e.g., to a user via the data monitoring UI) a list of the datasets available and their corresponding encode values 112. In some embodiments, the distribution of data values in a dataset are plotted into any of various suitable diagrams. Further, in some embodiments, the data monitoring dashboard module 208 may include a results post-processor that is operable to further process and analyze validation results from the validation results data store 206. In various embodiments, the data monitoring dashboard module 208 is operable to push processed validation results to other external services (e.g., data publisher 220). For example, in various embodiments, validation results 114 are sent to data publisher 220 automatically after the data validation operations have been performed by data validation module 104.

As shown in FIG. 2, if the dataset 110 successfully passes the data validation operations, data publisher 220 may store the dataset 110 in one or more data stores, such as live data stores 210 at production datacenter 209 (where it may be utilized by online services 212) and live data store 216 at non-production datacenter 214 (where it may be used in various analytical operations and by data encoder module 202 for future encoding operations). If, however, the dataset 110 does not pass the data validation operations, system 200 may perform one or more corrective actions. As a non-limiting example, in various embodiments, if the dataset 110 does not pass the validation operations, the dataset 110 may be flagged for manual review before it is stored in any other data stores. As another non-limiting example, in various embodiments, if the dataset 110 does not pass the validation operations, the dataset 110 may be discarded and regenerated. In instances in which any anomalies are found in dataset 110, the data monitoring dashboard module 208 is operable to send notifications (e.g., via email, SMS messaging, etc.) to various users associated with the data monitoring system 102 or the dataset 110, according to some embodiments. Further, in some embodiments, the data monitoring dashboard module 208 is operable to provide an API for other external services to actively query for validation results 114.

Note that, in various embodiments, one or more of data validation module 104, data encoder module 202, and data monitoring dashboard module 208 may be implemented as microservices executed by various computer systems at one or more datacenters within the system 200. Additionally, note that, in some embodiments, the term "computer system" may refer to a single machine executing at a datacenter. In other embodiments, the term "computer system" may refer to multiple machines executing at a datacenter for the benefit of a single entity.

Figure 3:
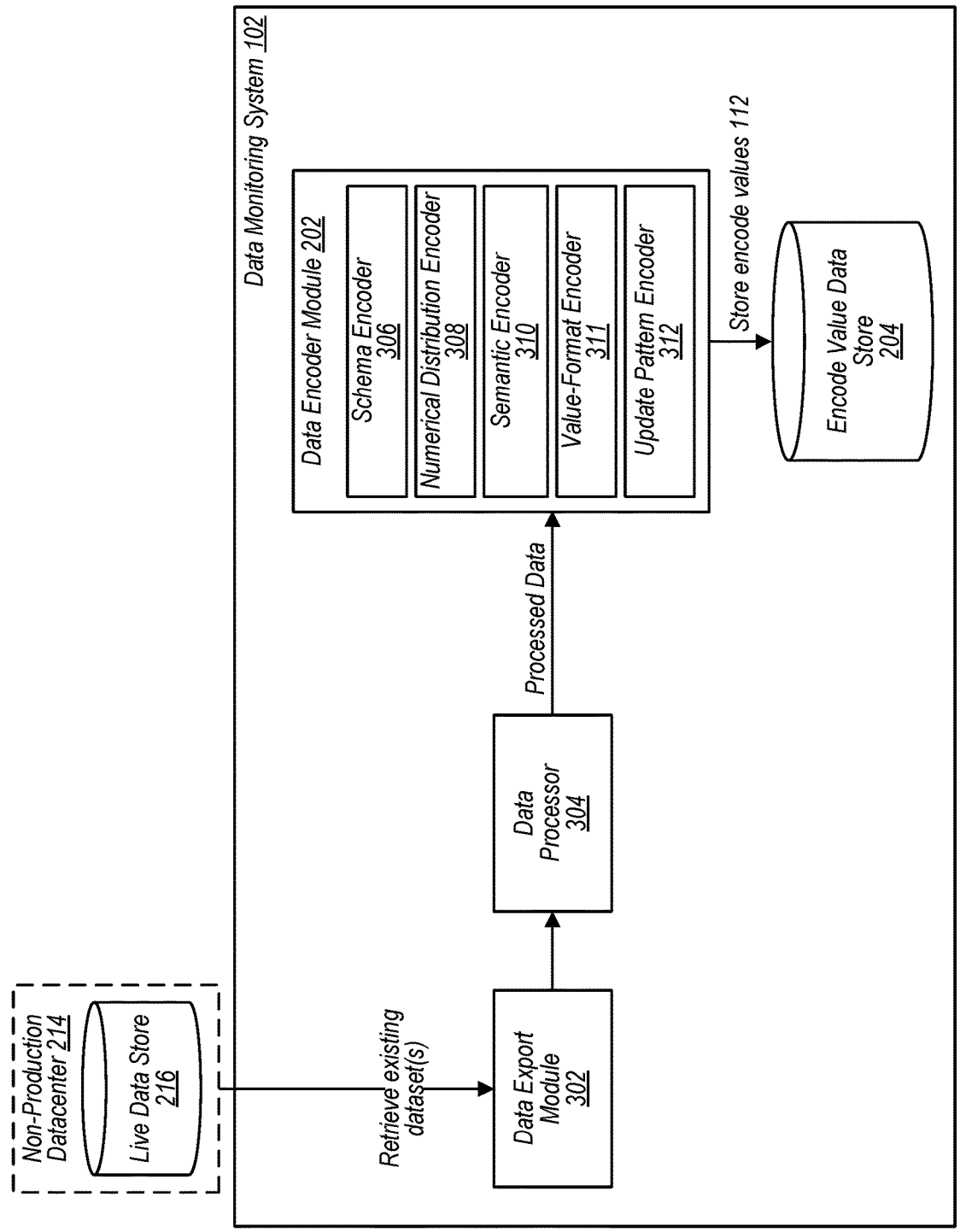
FIG. 3 is a block diagram illustrating an example data encoder module, according to some embodiments.

FIG. 3 depicts a block diagram with a more detailed view of data encoder module 202, according to some embodiments. As described in more detail below, data encoder module 202 includes various sub-modules that are operable to generate various encode values 112 that may be used, by data validation module 104, to validate various characteristics associated with a new or updated dataset 110.

In FIG. 3, data monitoring system 102 includes data export module 302, which is operable to retrieve existing datasets from live data store 216, in some embodiments. For example, in various embodiments, data export module 302 is operable to export datasets (or portions of datasets) from the live data store 216. In various embodiments, data export module 302 may operate in a batch mode (retrieving data from live data store 216 at predetermined time intervals) or in a streaming mode (retrieving data from the live data store 216 at or near the time that such data is added to the live data store 216). Data monitoring system 102, in the embodiment of FIG. 3, further includes data processor 304. In various embodiments, data processor 304 is operable to process the data retrieved by data export module 302 and convert it into one or more formats for input into the various encoder sub-modules of data encoder module 202. Non-limiting examples of the operations that may be performed by the data processor 304 include: cleaning empty data records, removing non-supported data type columns, removing quasi-numerical variables, etc.

In the depicted embodiment, data encoder module 202 includes schema encoder 306, numerical distribution encoder 308, semantic encoder 310, value-format encoder 311, and update pattern encoder 312. Note, however, that this embodiment is provided merely as one non-limiting example. In other embodiments, additional or fewer encoder sub-modules may be included in data encoder module 202, as desired. Schema encoder 306, in various embodiments, is operable to encode the properties of the schemas of the various datasets retrieved from the live data store 216 to generate corresponding "schema encode values." As a non-limiting example, these properties may include the number of data fields, the format of the data fields, metadata record hash codes, the number of data record keys, the update frequency, the data source, the creation time, the schema type, or any of various other suitable items of metadata corresponding to the schemas. Note, however, that, in various embodiments, the structure of the schema encode values may vary among different schema for different datasets in the plurality of datasets. In various embodiments, the information included in the schema encode values (also referred to as "schema encodes") may be used by data validation module 104 to quickly validate the schema of a dataset 110, as explained in more detail below. For example, in various embodiments, the attributes specified in the schema encodes may be used to determine whether a schema of an updated version of a dataset 110 is backwards compatible with the schema(s) of previous versions of the dataset 110. Stated differently, in various embodiments, the attributes in the schema encodes may be used to determine if a new version of a schema is backwards-compatible with previous versions of the same schema.

Numerical distribution encoder 308, in various embodiments, is operable to generate encode values 112 that are usable by data validation module 104 to validate one or more value distributions associated with data in dataset 110. For example, in some embodiments, numerical distribution encoder 308 is operable to generate "distribution encode values" corresponding to a distribution of numerical values included in the datasets retrieved from the live data store 216. Numerical distribution encoder 308, in various embodiments, is operable to calculate a latent probability distribution of the data values in one or more of the datasets retrieved from live data store 216. For example, in some embodiments, numerical distribution encoder 308 is operable to calculate the latent probability distribution of a dataset across multiple data record keys and across a temporal distribution of a historical version of the dataset. A "historical version" of a dataset may include multiple values for each data record (or a significant number of the data records in the dataset) in the dataset, indicating the value of the data records at different points in time over a particular retention time period. Stated differently, in some embodiments, the system 200 (e.g., live data store 216, experimental data store 218, etc.) may store "time-series" datasets in which, for each data record key, the time-series dataset includes a full history of the data record's values across different points in time. Further, as will be appreciated by one of skill in the art with the benefit of this disclosure, the term "latent probability distribution" refers to the probability distribution of latent variables that are estimated based on observed variables, rather than through direct observation. In some embodiments, the numerical distribution encoder 308 is operable to generate distribution encode values that include one or more latent probability distribution based on data retrieved from the live data store 216.

In various embodiments, the latent probability distribution(s) may be calculated using any of various suitable machine learning models, such as an autoencoder. As one non-limiting example, numerical distribution encoder 308 may generate one or more latent probability distributions based on the data retrieved from the live data store 216 using the Deep Autoencoding Gaussian Mixture Model (DAGMM). As will be appreciated by one of skill in the art with the benefit of this disclosure, the DAGMM consists of two major components: a compression network that projects samples into a low-dimensional space and an estimation network that infers latent variables and evaluates sample energy in the low-dimensional space under the Gaussian Mixture Modeling framework. In various embodiments, numerical distribution encoder 308 may be used to provide an end-to-end training framework for the DAGMM. Note, however, that this embodiment is listed as an example and is not intended to limit the scope of the disclosure. In various embodiments, the type of encoder used may vary depending on the type of data being encoded.

Semantic encoder 310, in various embodiments, is operable to generate encode values 112 that are usable by data validation module 104 to validate the semantic content of data in dataset 110. For example, in some embodiments, semantic encoder 310 is operable to use one or more natural language processing (NLP) language models to calculate vector word-embedding representations of data values in the datasets retrieved from the live data store 216. As will be appreciated by one of skill in the art with the benefit of this disclosure, word-embedding is a technique used to map words or phrases from a corpus of text to vectors of real numbers. Stated differently, word-embedding is a process by which the semantic or syntactic use of words or phrases are encoded based on their usage in a corpus of data. In some embodiments, the semantic encode values generated by semantic encoder 310 may include these vector word-embedding representations and trained NLP language model(s), which may be used by data validation module 104 as metrics to validate the semantic content of data records in dataset 110. For example, in some embodiments, the vector word-embedding representations may be used by data validation module 104 to verify that, in dataset 110, values in an "address" field actually refer to an address and not to some other value. For example, using the vector word-embedding representations, data validation module 104 is operable to detect if a data record from dataset 110 carries a value that does not refer to a city as the word-embedding representation vector for that data record will be "far" (e.g., as measured by Euclidean distance or through other suitable measures) from other values in the same data field.

Value-format encoder 311, in various embodiments, is operable to generate encode values 112 that are usable by data validation module 104 to validate a format of string-type data in dataset 110. Note that, as used herein, the term "string-type data" is used broadly to refer to data that includes an ordered plurality of characters. In some embodiments, string-type data may be may be specified using a string data type. In other embodiments, however, string-type data may be specified using one or more other data types (e.g., an array). Further, in some embodiments, string-type data may be specified using an object, such as an instance of the String class in the Java™ programming language. In some embodiments, value-format encoder 311 is operable to automatically synthesize regular expressions, based on data from the datasets retrieved from live data store 216, without external guidance. In some such embodiments, value-format encoder 311 is operable to utilize an algorithm, based on genetic programming, which is an evolutionary computation paradigm that implements a heuristic search in a space of candidate solutions. According to some such embodiments, the algorithm executes a search driven by a multi-objective optimization strategy aimed at simultaneously improving multiple performance indexes of candidate solutions. Techniques that may be used to generate regular expressions based on genetic programming, according to some embodiments, are described in more detail in "Inference of Regular Expressions for Text Extraction from Examples" by A. Bartoli, A. De Lorenzo, E. Medvet and F. Tarlao, available in *IEEE Transactions on Knowledge and Data Engineering*, vol. 28, no. 5, pp. 1217-1230, 1 May 2016. In various embodiments, value-format encoder 311 is operable to provide a training service for these genetic models (e.g., one model for each variable). In various embodiments, the regular expression construction process is performed automatically using genetic programming algorithms on sampled data records from the datasets retrieved from live data store 216. In some such embodiments, the encode values 112 generated by value-format encoder 311 are the automatically generated regular expressions, which may be used, as described in more detail below, to validate string-type data in the dataset 110. Note that the specific techniques described above are provided merely as examples and are not intended to limit the scope of the present disclosure.

Update pattern encoder 312, in various embodiments, is operable to generate encode values 112 that are usable by data validation module 104 to validate an update pattern associated with one or more data records in dataset 110. For example, in some embodiments, dataset 110 is an updated version of an existing dataset maintained by (or accessible to) the system 200 in which the data monitoring system 102 is implemented. For example, as noted above, live data store 216, in various embodiments, may maintain historical versions of one or more datasets. In instances in which dataset 110 is an updated version of a historical dataset maintained by system 200 (e.g., at live data store 216), it may be desirable to validate the manner in which the data in dataset 110 is being updated with reference to previous versions of the same dataset. In various embodiments, update pattern encoder 312 is operable to generate update pattern encode values corresponding to the temporal dimension of the data records in the historical dataset for use by data validation module 104 to validate the update pattern of the dataset, as explained in more detail below with reference to FIG. 4.

Figure 4:
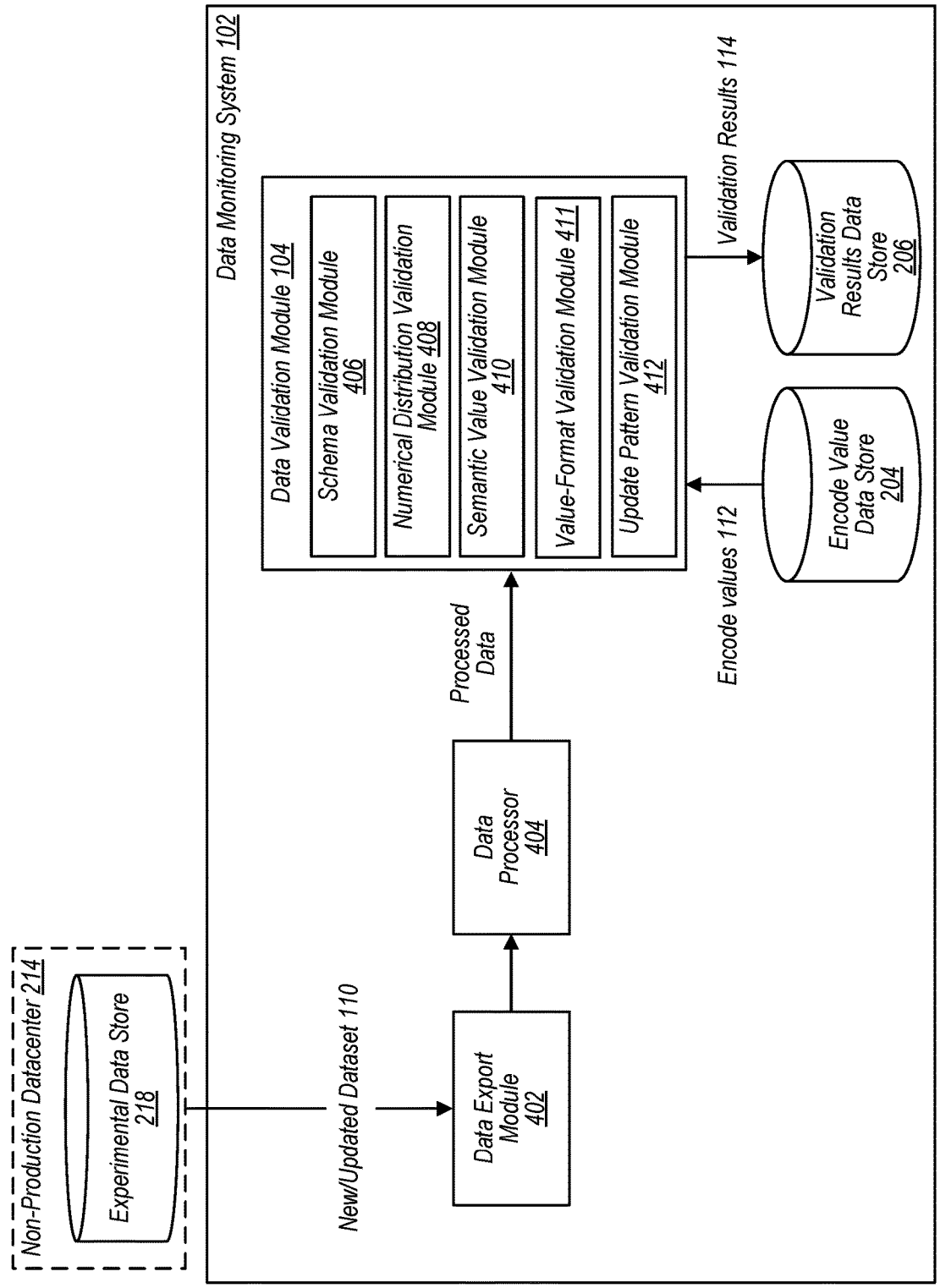
FIG. 4 is a block diagram illustrating an example data validation module, according to some embodiments.

FIG. 4 depicts a block diagram with a more detailed view of data validation module 104, according to some embodiments. As described in more detail below, data validation module 104 includes various validation sub-modules that are operable to validate various characteristics associated with a new or updated dataset 110.

In FIG. 4, data monitoring system 102 includes data export module 402, which is operable to retrieve dataset 110 from experimental data store 218 at non-production datacenter 214, in some embodiments. For example, in various embodiments, data export module 402 is operable to export dataset 110 (or a portion thereof) from experimental data store 218. In various embodiments, data export module 402 may operate in a batch mode (retrieving datasets 110 at predetermined time intervals) or in a streaming mode (retrieving datasets 110 at or near the time that they are added to the experimental data store 218). Data monitoring system 102, in the embodiment of FIG. 4, further includes data processor 404. In various embodiments, data processor 404 is operable to process the data in dataset 110 and convert it into one or more formats for input into the various validation sub-modules of data validation module 104. Non-limiting examples of the operations that may be performed by the data processor 404 include: cleaning empty data records, removing non-supported data type columns, removing quasi-numerical variables, etc.

Further note that, in FIG. 4, data monitoring system 102 includes (or has access to) encode value data store 204 and validation results data store 206. As noted above, in various embodiments, data validation module 104 is operable to retrieve various encode values 112 from encode value data store 204 for use in validation operations. Once it has performed one or more of the various validation operations, data validation module 104 may store validation results 114 indicative of an outcome of these validation operations in validation results data store 206, as described above.

In the depicted embodiment, data validation module 104 includes schema validation module 406, numerical distribution validation module 408, semantic value validation module 410, value-format validation module 411, and update pattern validation module 412. Note, however, that this embodiment is provided merely as one non-limiting example. In other embodiments, additional or fewer validation sub-modules may be included in data validation module 104, as desired. Further note that, in various embodiments, one or more of the encoder sub-modules shown in FIG. 3 may train multiple machine learning models.

Schema validation module 406, in various embodiments, is operable to validate a schema of dataset 110 using the encode values 112 generated by schema encoder 306 of FIG. 3. In various embodiments, schema validation module 406 is operable to verify that the schema of dataset 110 is not corrupted and that it is backwards compatible with the schema(s) of previous versions of the dataset 110 (if such previous versions exists). For example, in various embodiments, schema validation module 406 is operable to take a sampling of the schema of an updated dataset 110 and compare it to the existing schema encode values generated by the schema encoder 306. In some embodiments, for example, the schema validation module 406 is operable to compare the number of data fields, the format of the data fields, the metadata record hash codes, or any of various other properties represented in the schema encode values to corresponding properties in the schema encodes for a particular dataset 110. Consider, for example, the different versions of a schema for an example dataset 110 shown below in Table 1:

TABLE 1

| Version | Schema Encode | Valid? |
|---|---|---|
| baseline | {num_fields: 10, num_keys: 2, frequency: weekly, source: fast-r, creation_time: 20170301000000, type: radd} | |
| New_1 | {num_fields: 8, num_keys: 1, frequency: weekly, source: fast-r, creation_time: 20180301000000, type: radd} | No |
| New_2 | {num_fields: 12, num_keys: 2, frequency: weekly, source: fast-r, creation_time: 20190301000000, type: radd} | Yes |

Table 1 includes three columns: a version column, a "Schema Encode" column, and a column used to indicate whether an updated version of a schema is deemed valid. In the depicted embodiment, Table 1 shows various attributes in the Schema Encode column, including the number of fields, the number of keys, the update frequency, the data source, the creation time, and the schema type. Further, Table 1 includes three rows that correspond to three versions of a schema for the example dataset 110. More specifically, the first row corresponds to a baseline version of the schema for the example dataset 110, the second row corresponds to a subsequent version ("New_1") of the schema for the example dataset 110, and the third row corresponds to a newly updated version ("New_2") of the schema for the example dataset 110. Note that, in the depicted embodiment, the "New_1" version of the schema has fewer data fields and keys than the baseline version and, as such, it will not be able to de-serialize existing data records that conform to the "baseline" version of the schema. In the "New_2" version of the schema, in the depicted embodiment, there is a higher number of data fields than in the baseline version or "New_1" version. In this example embodiment, this increase in the number of data fields may degrade existing data records if the data types do not match but, in some such embodiments, schema validation module 406 may perform a datatype match detection operation using a try-decode step.

Further, in various embodiments, schema validation module 406 is operable to use the new schema associated with updated dataset 110 to decode its data records, as well as the older versions of the data records in previous versions of dataset 110. For example, in some embodiments, some or all of the datasets in the system 200 in which the data monitoring system 102 is deployed are structured data, which are transferred among different applications and services using various types of transfer protocols and stored in various types of data stores. In various embodiments, for the data records in these datasets to be read, stored, and transferred correctly, the system 200 utilizes a number of techniques for serializing the structured data records. Non-limiting examples of techniques used to serialize structured data records include Protobuf™ and Apache Avro™. To be serialized, each dataset may have a schema file (e.g., a .proto file) and its corresponding data files encoded in binary format, according to some embodiments. To read the data file content, in such embodiments, the schema file may be decoded and used to de-serialize the raw data content. If the schema content for a new or updated dataset 110 is corrupted during transformation or in transit, or if the new version of the schema is not backwards compatible (e.g., by having the wrong number of data fields, key fields, data types, etc.), the system 200 may be unable to decode and de-serialize the data files it previously encoded.

Numerical distribution validation module 408, in various embodiments, is operable to use the encode values 112 generated by numerical distribution encoder 308 to validate one or more value distributions associated with data in dataset 110. For example, in some embodiments, numerical distribution validation module 408 is operable to validate a distribution of numerical values included in the dataset 110. Note that, in some embodiments, the encode values 112 generated by the numerical distribution encoder 308 (that is, the distribution encode values) include one or more latent probability distributions corresponding to datasets retrieved from the live data store 216. Additionally, in some embodiments, the encode values 112 generated by the numerical distribution encoder 308 include one or more trained machine learning models, such as a trained DAGMM model. Numerical distribution validation module 408, in various embodiments, is operable to load sampled data from the dataset 110 and apply the trained machine learning model(s) (e.g., the DAGMM model) to estimate the latent probability distribution of numerical data in the dataset 110. In various embodiments, numerical distribution validation module 408 may then compare the latent probability distribution of the dataset 110 against the latent probability distribution(s) generated by numerical distribution encoder 308 for one or more of the datasets retrieved from the live data store 216. In some embodiments, if the latent probability distribution of the dataset 110 does not match the estimated latent probability distribution, the numerical distribution validation module 408 is operable to flag the dataset 110 as potentially containing anomalous numerical values.

Semantic value validation module 410, in various embodiments, is operable to use the encode values 112 generated by the semantic encoder 310 of FIG. 3 to validate the semantic content of data in dataset 110. For example, as noted above, in various embodiments the encode values 112 generated by the semantic encoder 310 (e.g., the "semantic encode values") include vector word-embedding representations of data values in the datasets retrieved from the live data store 216. In various embodiments, semantic value validation module 410 is operable to use these vector word-embedding representations to validate the semantic values of data records in the new or updated dataset 110. For example, in some embodiments, the semantic value validation module 410 is operable to apply the trained NLP language model to the values of the data records in the new or updated dataset 110 to generate vector word-embedding representations for the new data records. Semantic value validation module 410 may then compare these vector word-embedding representations to the previously generated vector word-embedding representations to detect anomalous values. For example, as noted above, semantic value validation module 410 may be used to verify that all values in an "address" field actually refer to an address and not to some other value. In various embodiments, the semantic value validation module 410 is operable to compare the vector word-embedding representations using Euclidean distance. Note, however, that this embodiment is provided merely as a non-limiting example. In other embodiments, any of various suitable techniques may be used to compare the vector word-embedding representations for the new data records in dataset 110 to the vector word-embedding representations previously generated by semantic encoder 310 based on data retrieved from live data store 216.

Value-format validation module 411, in various embodiments, is operable to use the encode values 112 generated by value-format encoder 311 of FIG. 3 to validate a value-format of string-type data included in dataset 110. For example, in some embodiments, the encode values 112 generated by the value-format encoder 311 include one or more regular expressions generated based on data in the datasets retrieved from the live data store 216. In various embodiments, value-format validation module 411 may use these regular expressions to validate a format of string-type data included in the dataset 110. For example, in some embodiments, these baseline regular expressions are used to match against the string-type data in the dataset 110 (e.g., using the compile and matcher methods from the java.util.regex.Pattern class in the Java™ programming language). Consider, for example, the string-type data shown in Table 2:

TABLE 2

| Sample | /\S+@\S+\.\S+/ |
|---|---|
| kb@example.com | match |
| Kbexample.com | Not match |

In Table 2, the left column shows two examples of string-type data that may be included in a field of a data record from dataset 110. In the right column, the top row shows an example regular expression pattern usable to detect a string in the format of an email address. In this depicted embodiment, value-format validation module 411 may use this regular expression to determine if a given data value matches this pattern (as in the case of the first data value) or not (as in the case of the second data value). Note, however, that this embodiment is provided merely as one non-limiting example.

Update pattern validation module 412, in various embodiments, is operable to use the encode values generated by the update pattern encoder 312 to validate an update pattern associated with one or more data records in dataset 110. For example, in various embodiments, the encode values 112 generated by the update pattern encoder 312 (the "update pattern encode values") include metadata corresponding to the historical versions of data records from one or more datasets. In various embodiments, update pattern validation module 412 is operable to use this metadata corresponding to the historical version of data records to verify that updated values for data records in the dataset 110 are consistent with previous updates to the data records. Stated differently, in various embodiments, the update pattern validation module 412 is operable to take into account the temporal dimension of a data record and its update frequency pattern. Consider, for example, the metadata shown in Table 3 below, which corresponds to the update pattern of a particular data record in dataset 110 over a two-year period:

TABLE 3

| Point-in-time | Key | Value 1 | Anomalous? |
|---|---|---|---|
| 20180301000000 | kb@example.com | 10 | No |
| 20190301000000 | kb@example.com | 11 | No |
| 20200301000000 | kb@example.com | 13 | No |
| 20200302000000 | kb@example.com | 200 | Yes |

As shown in Table 3, the example data record is typically updated on a yearly basis, with small changes to the value of the "Value 1" field being made on March $1^{st}$ of 2018, 2019, and 2020. In this depicted embodiment, the last row of Table 3 (corresponding to the most-recent update to this data record in dataset 110), shows that the "Value 1" field was updated within one day and that the value of the "Value 1" field increased by significantly more than in previous updates to the data record (e.g., out of the normal value distribution for this field). In this depicted embodiment, the update pattern validation module 412 may identify this update to the data record as a potentially anomalous update (e.g., due to the change in frequency and the significant change in the value of the "Value 1" field) and flag the data record (or the dataset 110 itself) for further review or other corrective action.

EXAMPLE METHODS

Figure 5:
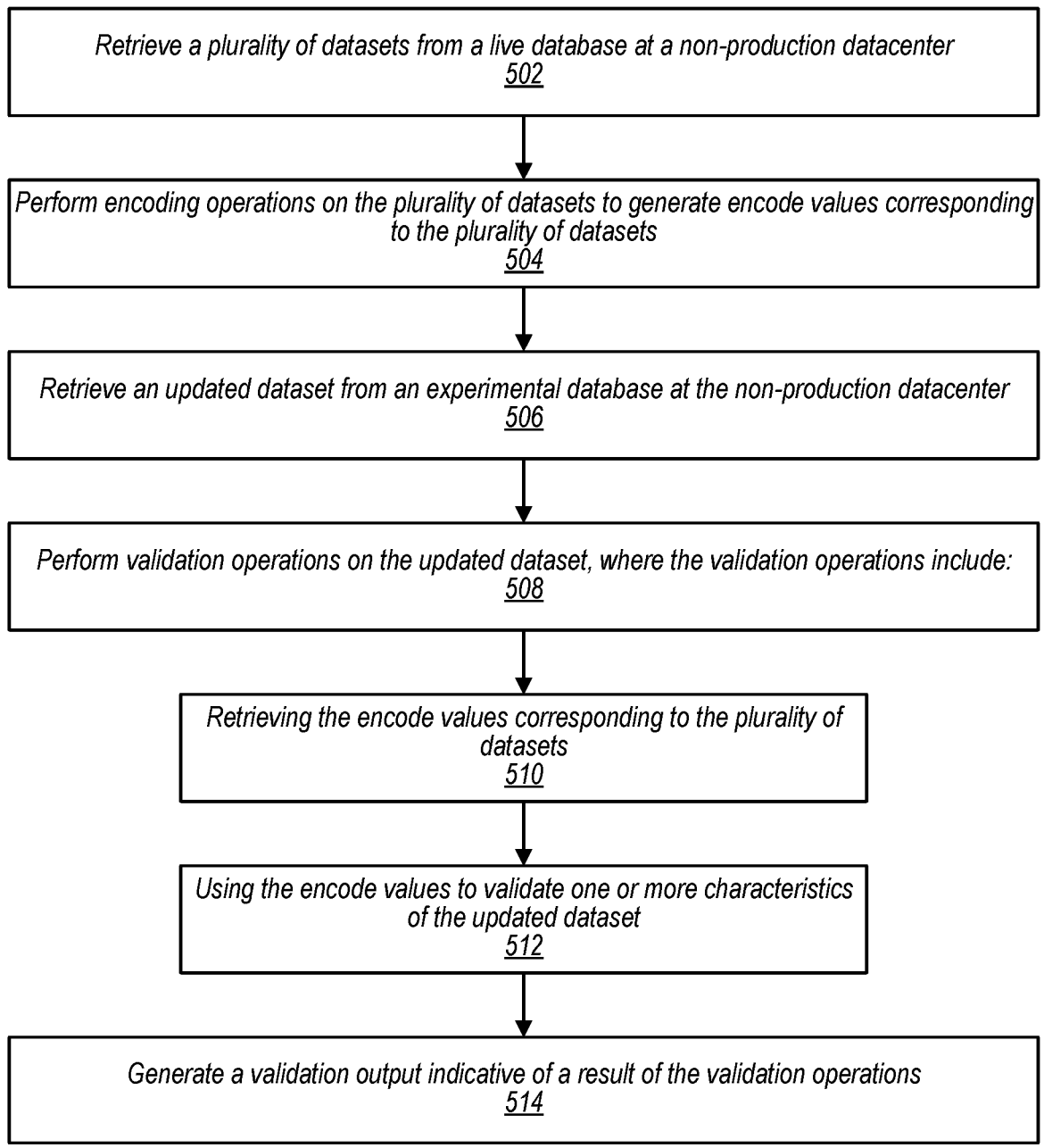
FIG. 5 is a flow diagram illustrating an example method for validating an updated dataset using encode values corresponding to previous datasets, according to some embodiments.

Referring now to FIG. 5, a flow diagram illustrating an example method 500 for validating an updated dataset using encode values corresponding to previous datasets is depicted, according to some embodiments. In various embodiments, method 500 may be performed by data monitoring system 102 of FIG. 2. For example, data monitoring system 102 may include (or have access to) a non-transitory, computer-readable medium having program instructions stored thereon that are executable by one or more computer systems in the data monitoring system 102 to cause the operations described with reference to FIG. 5. In FIG. 5, method 500 includes elements 502-514. Although these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, data monitoring system 102 retrieves a plurality of datasets from a live database at a non-production datacenter. For example, with reference to FIG. 3, data export module 302 may retrieve a plurality of datasets from live data store 216 at non-production datacenter 214. At 504, in the illustrated embodiment, data monitoring system 102 performs encoding operations on the plurality of datasets to generate first encode values corresponding to the plurality of datasets. For example, in various embodiments, data encoder module 202 is operable to perform various encoding operations on data from the plurality of datasets retrieved from the live data store 216. In some embodiments, the data encoder module 202 use the plurality of datasets (or a portion of one or more of the plurality of datasets) to train an autoencoder machine learning model based on the plurality of datasets to generate a first trained autoencoder. As one non-limiting example, in some embodiments the data encoder module 202 may train a DAGMM machine learning model using data from the plurality of datasets.

Note that, in some embodiments, method 500 may further include processing some or all of the data in the plurality of datasets prior to performing the encoding operations. For example, as described above with reference to FIG. 3, in various embodiments the data processor 304 is operable to process the data based on the input requirements of the one or more encoders used by data encoder module 202. As a non-limiting example, the data processor 304 may clean any empty data records, remove non-supported data type columns, remove quasi-numerical variables, etc. Note that, in various embodiments, the manner in which data processor 304 pre-processes the data from the plurality of datasets may vary depending on the types of encoders being used by data encoder module 202.

At 506, in the illustrated embodiment, data monitoring system 102 retrieves an updated dataset from an experimental database at the non-production datacenter. For example, with reference to FIG. 4, in some embodiments, the data export module 402 is operable to retrieve updated dataset 110 from the experimental data store 218. At 508, in the illustrated embodiment, data monitoring system 102 performs validation operations on the updated dataset. For example, in various embodiments, data validation module 104 is able to perform validation operations to validate one or more characteristics of the updated dataset 110. As one non-limiting example, in some embodiments, data validation module 104 is operable to apply the first trained autoencoder to the updated dataset 110 to detect one or more anomalous data records in the updated dataset 110.

In the depicted embodiment, element 508 includes elements 510 and 512. At 510, in the illustrated embodiment, the data monitoring system 102 retrieves first encode values corresponding to the plurality of datasets. For example, as discussed above with reference to FIG. 4, data validation module 104 may retrieve encode values from the encode value data store 204. At 512, in the illustrated embodiment, the data monitoring system 102 uses the first encode values to validate one or more characteristics of the updated dataset. For example, as noted above and described in more detail below with reference to FIGS. 6-10, data validation module 104 is operable, in various embodiments, to validate one or more of: a schema associated with the updated dataset 110, an update pattern associated with data records in the updated dataset 110, a value distribution of numerical or string-type data included in the updated dataset 110, and semantic values associated with one or more data records in the updated dataset 110.

At 514, in the illustrated embodiment, data monitoring system 102 generates a validation output indicative of a result of the validation operations. For example, in some embodiments, data validation module 104 may generate validation results 114 that indicates an outcome of the validation operations performed by the data validation module 104. In some embodiments, for example, the validation results 114 indicates an outcome for each of the one or more validation operations performed on the updated dataset 110, such as whether the updated dataset 110 passed a given validation operation or whether any anomalous data in the updated dataset 110 was detected. Validation results 114 may be provide in any of various suitable formats, such as one or more Boolean values, numerical values, flags, etc. In various embodiments, data validation module 104 may store the validation results 114, along with an indication of the updated dataset 110 to which it relates, in validation results data store 206. As noted above, in various embodiments, data monitoring dashboard module 208 may access the validation results data store 206 to provide users with validation information relating to various datasets.

As noted above, in various embodiments, data validation module 104 is operable to validate various characteristics of an updated dataset. With reference to FIGS. 6-10, example methods 600-1000 are discussed, which may be performed by data validation module 104 to validate these various characteristics of a new or updated dataset 110, according to some embodiments. In various embodiments, data monitoring system 102 may include (or have access to) a non-transitory, computer-readable medium having program instructions stored thereon that are executable by one or more computer systems in the data monitoring system 102 to cause the operations described with reference to FIGS. 6-10.

Figure 6:
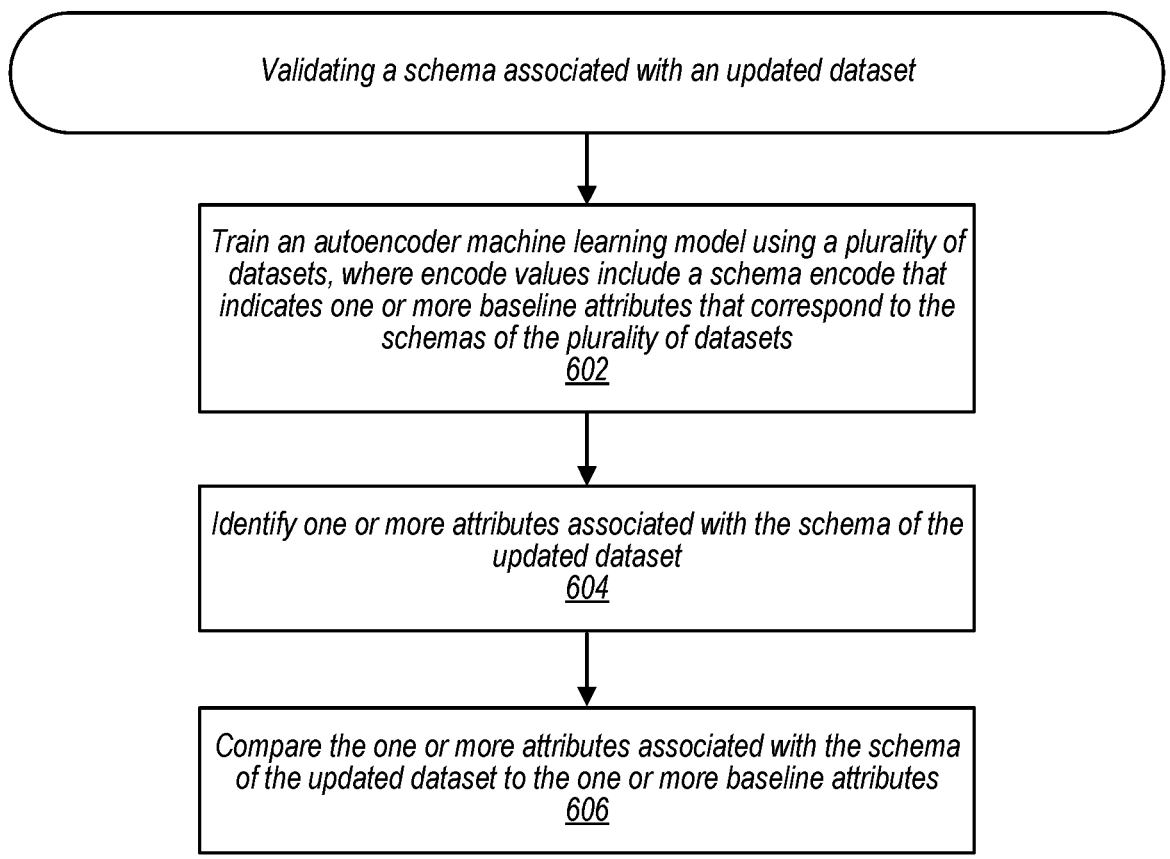
FIG. 6 is a flow diagram illustrating an example method for validating a schema associated with an updated dataset, according to some embodiments.

Turning now to FIG. 6, a flow diagram illustrating an example method 600 for validating a schema associated with an updated dataset is depicted, according to some embodiments. In FIG. 6, method 600 includes elements 602-606. Although these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, the data validation module 104 trains an autoencoder machine learning model using a plurality of datasets (e.g., that were retrieved from the live data store 216) and generates first encode values. For example, in various embodiments, schema encoder 306 is operable to auto-encode the properties of the schema of the various datasets retrieved from live data store 216 at non-production datacenter 214. In various embodiments, this encoding process may be used to generate first encode values. For example, in various embodiments, the first encode values include a schema encode that indicates one or more baseline attributes that correspond to the schemas of the plurality of datasets, such as the number of data fields, the format of the data fields, metadata record hash codes, the number of keys, the update frequency, the data source, the creation time, the schema type, or any of various other suitable items of metadata corresponding to the schemas.

At 604, in the illustrated embodiment, the data validation module 104 identifies one or more attributes associated with the schema of the updated dataset. For example, in some embodiments, schema validation module 406 is operable to take a sampling of the schema of an updated dataset 110, such as the number of data fields, format of data fields, number of keys, etc.

At 606, in the illustrated embodiment, the data validation module 104 compares the one or more attributes associated with the schema of the updated dataset to the one or more baseline attributes from the first encode values. For example, in various embodiments, the schema validation module 406 is operable to compare the attributes associated with the new or updated dataset 110 with attributes include in the schema encode values. In various embodiments, schema validation module 406 is operable to generate an output indicative of the schema-validation operations that indicate, for example, whether the schema of the dataset 110 is compatible with previous versions of the schema or whether the schema of the dataset 110 has been corrupted. In various embodiments, data validation module 104 may include the output of these schema validation operations as part of validation results 114 stored in validation results data store 206.

Referring now to FIG. 7, a flow diagram illustrating an example method 700 for validating an update pattern associated with one or more data records in an updated dataset is depicted, according to some embodiments. In FIG. 7, method 700 includes elements 702-704. Although these elements are shown in a particular order for ease of understanding, other orders may be used. In various embodiments, some of the method elements may be performed concurrently, in a different order than shown, or may be omitted. Additional method elements may also be performed as desired.

At 702, in the illustrated embodiment, data validation module 104 encodes a historical version of a first dataset to generate update pattern encode values associated with the first dataset. For example, as noted above, in some embodiments, dataset 110 is an updated version of a historical dataset that is already maintained in the system 200 (e.g. in the live data store 216 at non-production datacenter 214). In some such embodiments, the update pattern encoder is operable to generate encode values 112 that include metadata corresponding to the temporal dimension of data records in the historical version of the datasets from live data store 216.

At 704, in the illustrated embodiment, data validation module 104 compares the one or more data records in the updated dataset to the update pattern encode values associated with the first dataset. For example, in some embodiments, update pattern validation module 412 is operable to use the encode values 112 generated by the update pattern encoder 312 to validate the updated pattern associated with data records in the dataset 110. As described above, for example, update pattern validation module 412 may compare attributes associated with an update to a data record (e.g., the update frequency, the amount of change to one or more data fields, etc.) to the historical update pattern associated with the same data record to determine whether an update to the data record is anomalous. In various embodiments, update pattern validation module 412 is operable to generate an output indicative of the schema-validation operations that indicate, for example, whether the update to a given data record is anomalous. In various embodiments, data validation module 104 may include the output of these update pattern validation operations as part of validation results 114 stored in validation results data store 206.

Figure 8:
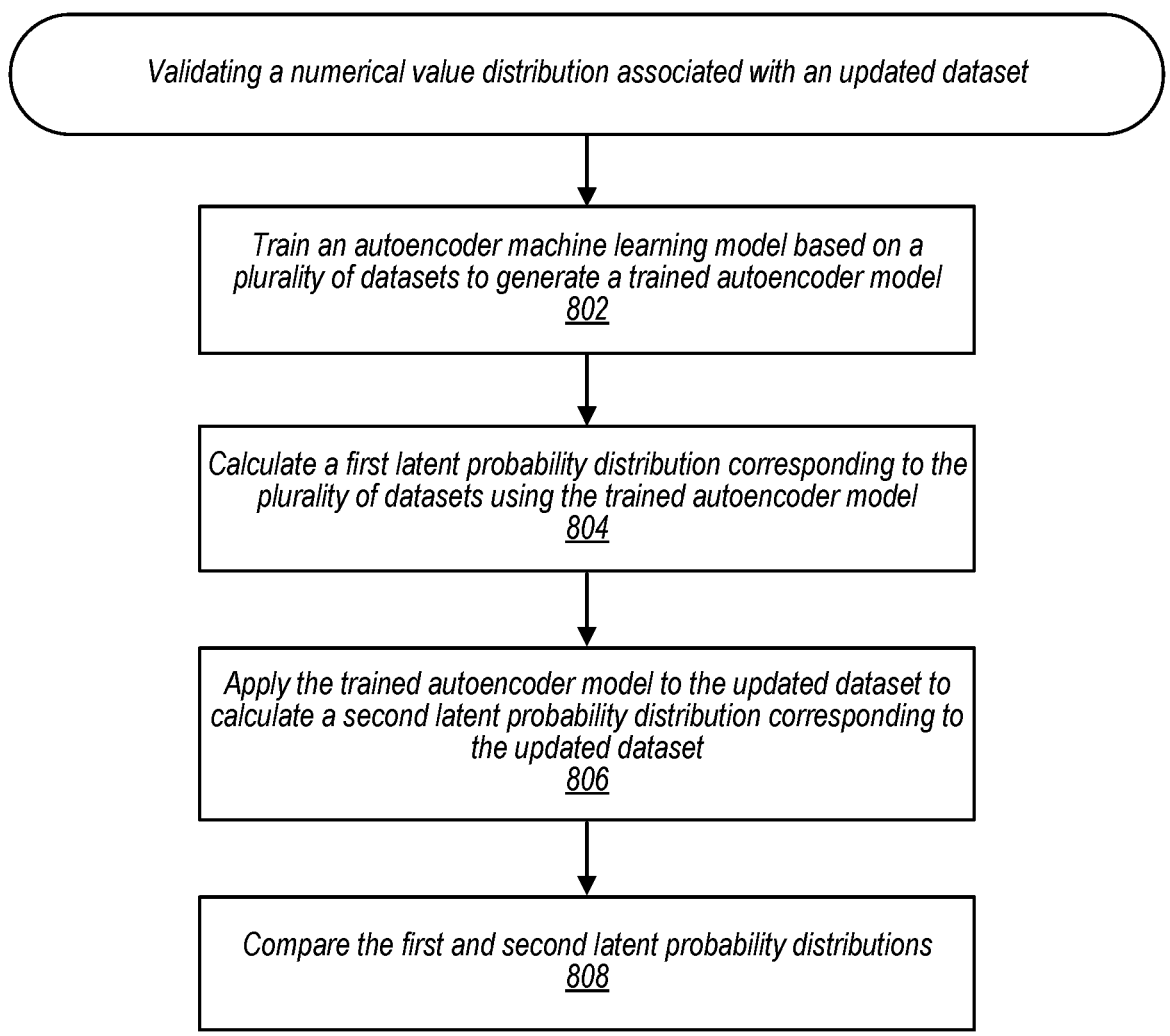
FIG. 8 is a flow diagram illustrating an example method for validating a numerical value distribution associated with an updated dataset, according to some embodiments.

Turning now to FIG. 8, a flow diagram illustrating an example method 800 for validating a numerical value distribution associated with an updated dataset is depicted, according to some embodiments. In FIG. 8, method 800 includes elements 802-808. Although these elements are shown in a particular order for ease of understanding, other orders may be used. In various embodiments, some of the method elements may be performed concurrently, in a different order than shown, or may be omitted. Additional method elements may also be performed as desired.

At 802, in the illustrated embodiment, data validation module 104 trains an autoencoder machine learning model based on a plurality of datasets to generate a trained autoencoder model. For example, in some embodiments, numerical distribution encoder 308 is operable to train an autoencoder machine learning model (such as the DAGMM) using data from existing datasets in the system 200 (e.g., the datasets retrieved from the live data store 216). At 804, in the illustrated embodiment, data validation module 104 calculates a first latent probability distribution corresponding to the plurality of datasets using the trained autoencoder model. For example, in various embodiments, the numerical distribution encoder 308 is operable to use the trained autoencoder model (e.g., the trained DAGMM) to calculate one or more latent probability distributions associated with these existing datasets.

At 806, in the illustrated embodiment, data validation module 104 applies the trained autoencoder model to the updated dataset to calculate a second latent probability distribution corresponding to the updated dataset. For example, in some embodiments, numerical distribution validation module 408 is operable to apply the trained autoencoder model to data in the dataset 110 to calculate one or more latent probability distributions corresponding to this dataset 110. At 808, in the illustrated embodiment, data validation module 104 compares the first and second latent probability distributions. For example, in some embodiments, the numerical distribution validation module 408 is operable to compare the latent probability distribution of the dataset 110 against the latent probability distribution(s) generated by numerical distribution encoder 308 for one or more of the datasets retrieved from the live data store 216. In various embodiments, data validation module 104 may include the output of these numerical distribution validation operations as part of validation results 114 stored in validation results data store 206. For example, if the latent probability distribution of the dataset 110 does not match the estimated latent probability distribution, the numerical distribution validation module 408 may generate output that indicates that the dataset 110 potentially contains anomalous numerical values.

Referring now to FIG. 9, a flow diagram illustrating an example method 900 for validating a value-format of string-type data included in an updated dataset is depicted, according to some embodiments. In FIG. 9, method 900 includes elements 902-904. Although these elements are shown in a particular order for ease of understanding, other orders may be used. In various embodiments, some of the method elements may be performed concurrently, in a different order than shown, or may be omitted. Additional method elements may also be performed as desired.

At 902, in the illustrated embodiment, data validation module 104 generates one or more regular expressions based on string-type data included in at least one of the plurality of datasets. For example, in some embodiments, the value-format encoder 311 is operable to generate one or more regular expressions based on the string-type data included in one or more of the datasets from data store 216 using one or more genetic programming algorithms, as described in more detail above with reference to FIG. 3. At 904, in the illustrated embodiment, data validation module 104 parses data in the updated dataset using the one or more regular expressions. In some embodiments, value-format validation module 411 is operable to use the previously generated regular expressions to match against string-type data in the dataset 110, for example to ensure that certain data fields (e.g., email address data fields) for data records in the dataset 110 include appropriately formatted data values. In various embodiments, data validation module 104 may include the output of these string-type data distribution validation operations as part of validation results 114 stored in validation results data store 206.

Figure 10:
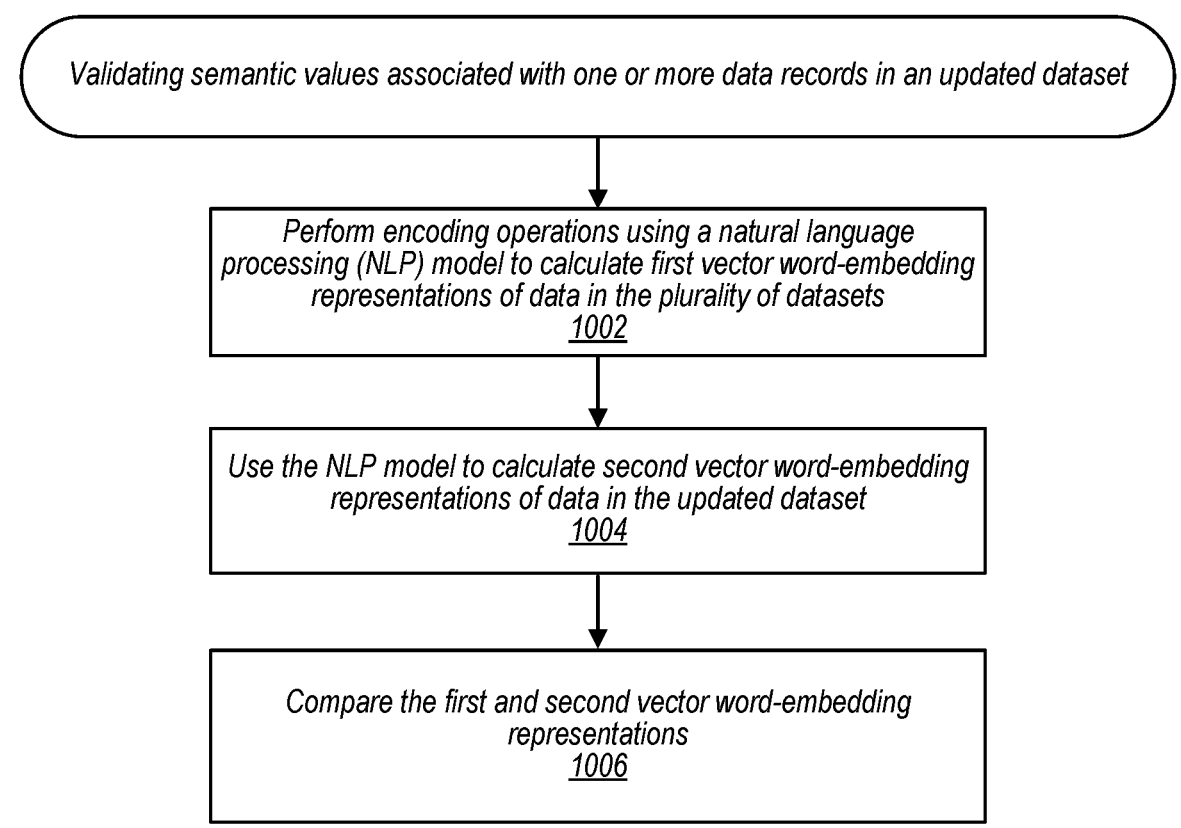
FIG. 10 is a flow diagram illustrating an example method for validating semantic values associated with one or more data records in an updated dataset, according to some embodiments.

Turning now to FIG. 10, a flow diagram illustrating an example method 1000 for validating semantic values associated with one or more data records in an updated dataset is depicted, according to some embodiments. In FIG. 10, method 1000 includes elements 1002-1006. Although these elements are shown in a particular order for ease of understanding, other orders may be used. In various embodiments, some of the method elements may be performed concurrently, in a different order than shown, or may be omitted. Additional method elements may also be performed as desired.

At 1002, in the illustrated embodiment, data validation module 104 performs encoding operations using a NLP model to calculate first vector word-embedding representations of data in the plurality of datasets. For example, in some embodiments, semantic encoder 310 is operable to use one or more NLP language models to calculate vector word-embedding representations of data in existing datasets in the system 200 (e.g., datasets retrieved from live data store 216). At 1004, in the illustrated embodiment, data validation module 104 uses the NLP model to calculate second vector word-embedding representations of data in the updated dataset. For example, in some embodiments, semantic value validation module 410 is operable to apply the trained NLP language model(s) to the values of data records in the new or updated dataset 110 to generate vector word-embedding representations for these data records.

At 1006, in the illustrated embodiment, data validation module 104 compares the first and second vector word-embedding representations. For example, in some embodiments, semantic value validation module 410 is operable to compare the vector word-embedding representations associated with the dataset 110 to the previously generated word-embedding representations of existing datasets. In various embodiments, semantic value validation module 410 is operable to compare the similarity of these values using Euclidean distance, though other suitable techniques may be used. In various embodiments, data validation module 104 may include the output of these semantic value validation operations as part of validation results 114 stored in validation results data store 206.

Example Computer System

Figure 11:
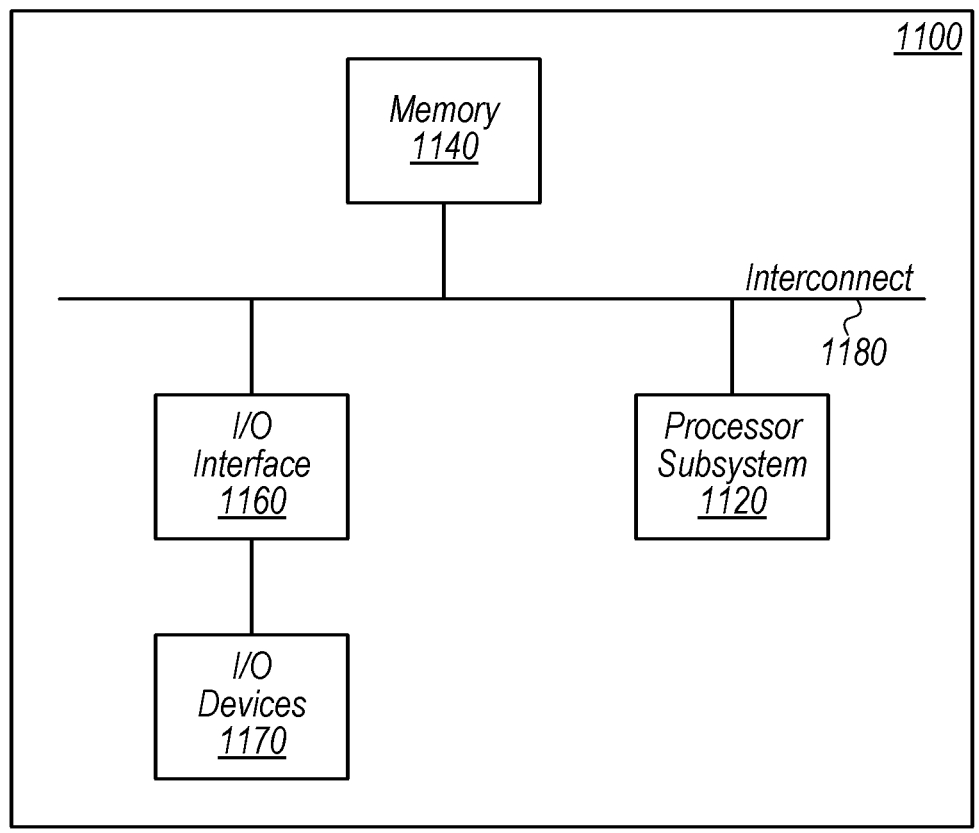
FIG. 11 is a block diagram illustrating an example computer system, according to some embodiments.

Referring now to FIG. 11, a block diagram of an example computer system 1100 is depicted, which may implement one or more computer systems, such as data monitoring system 102, according to various embodiments. Computer system 1100 includes a processor subsystem 1120 that is coupled to a system memory 1140 and I/O interfaces(s) 1160 via an interconnect 1180 (e.g., a system bus). I/O interface(s) 1160 is coupled to one or more I/O devices 1170. Computer system 1100 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 1100 is shown in FIG. 11 for convenience, computer system 1100 may also be implemented as two or more computer systems operating together.

Processor subsystem 1120 may include one or more processors or processing units. In various embodiments of computer system 1100, multiple instances of processor subsystem 1120 may be coupled to interconnect 1180. In various embodiments, processor subsystem 1120 (or each processor unit within 1120) may contain a cache or other form of on-board memory.

System memory 1140 is usable to store program instructions executable by processor subsystem 1120 to cause system 1100 perform various operations described herein. System memory 1140 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1100 is not limited to primary storage such as system memory 1140. Rather, computer system 1100 may also include other forms of storage such as cache memory in processor subsystem 1120 and secondary storage on I/O devices 1170 (e.g., a hard drive, storage array, etc.). In some embodiments, these other forms of storage may also store program instructions executable by processor subsystem 1120.

I/O interfaces 1160 may be any of various types of interfaces configured to couple to and communicate with other devices, according to various embodiments. In one embodiment, I/O interface 1160 is a bridge chip (e.g., Southbridge) from a front-side to one or more back-side buses. I/O interfaces 1160 may be coupled to one or more I/O devices 1170 via one or more corresponding buses or other interfaces. Examples of I/O devices 1170 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1170 includes a network interface device (e.g., configured to communicate over WiFi, Bluetooth, Ethernet, etc.), and computer system 1100 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation [entity]—configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., data validation module 104, data encoder module 202, schema encoder 306, schema validation module 406, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardware circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    accessing, by a data monitoring system, one or more current datasets used by a first live database at a production datacenter and a second live database at a non-production datacenter, wherein the first live database uses the one or more current datasets to support a production version of a web service for client use, and wherein the second live database uses the one or more current datasets to perform analytics on the production version of the web service;
    performing, by the data monitoring system, encoding operations on the one or more current datasets to generate encode values corresponding to the one or more current datasets;
    retrieving, by the data monitoring system, an experimental dataset from an experimental database at the non-production datacenter, wherein
        the one or more current datasets and the experimental dataset include data organized into multiple data records having values corresponding to multiple data fields,
        the one or more current datasets and the experimental dataset have respective dataset schemas,
        attributes of the dataset schemas include a number of data fields and formats of data fields, and
        the experimental dataset is a new or updated dataset as compared to the one or more current datasets;
    performing, by the data monitoring system, validation operations on the experimental dataset, wherein the validation operations include:
        retrieving the encode values corresponding to the one or more current datasets; and
        using the encode values to validate one or more characteristics of the experimental dataset; and
    in response to a determination of success of the validation operations, generating, by the data monitoring system, a validation output permitting publication of the experimental dataset to the first and second live databases for updating or modification of the first and second live databases.

2. The method of claim 1, wherein the encoding operations include:
    training an autoencoder machine learning model based on the one or more current datasets to generate a trained autoencoder.

3. The method of claim 2, wherein the validation operations further include:
applying the trained autoencoder to the experimental dataset to detect one or more anomalous data records in the experimental dataset.

4. The method of claim 1, wherein the performing validation operations includes validating the dataset schema associated with the experimental dataset.

5. The method of claim 4, wherein the performing encoding operations includes training an autoencoder machine learning model using the one or more current datasets, wherein the encode values include a schema encode value that indicates one or more baseline attributes that correspond to the dataset schemas of the one or more current datasets.

6. The method of claim 5, wherein the validating the dataset schema associated with the experimental dataset includes:
identifying one or more attributes associated with the dataset schema of the experimental dataset; and
comparing the one or more attributes associated with the dataset schema of the experimental dataset to the one or more baseline attributes associated with the dataset schemas of the one or more current datasets.

7. The method of claim 1, wherein the performing validation operations includes validating an update pattern associated with one or more data records in the experimental dataset.

8. The method of claim 7, wherein the experimental dataset is an updated version of a first dataset, and wherein the one or more current datasets includes a historical version of the first dataset; and
wherein the performing encoding operations includes encoding the historical version of the first dataset to generate update pattern encode values associated with the first dataset.

9. The method of claim 8, wherein the validating the update pattern includes comparing the one or more data records in the experimental dataset to the update pattern encode values associated with the first dataset.

10. A non-transitory, computer-readable medium having instructions stored thereon that are executable by a data monitoring system to perform operations comprising:
accessing one or more current datasets used by a first live database at a production datacenter and a second live database at a non-production datacenter, wherein the first live database uses the one or more current datasets to support a production version of a web service for client use, and wherein the second live database uses the one or more current datasets to perform analytics on the production version of the web service;
performing encoding operations on the one or more current datasets to generate encode values corresponding to the one or more current datasets;
retrieving an experimental dataset from an experimental database at the non-production datacenter, wherein
the one or more current datasets and the experimental dataset include data organized into multiple data records having values corresponding to multiple data fields,
the one or more current datasets and the experimental dataset have respective dataset schemas,
attributes of the dataset schemas include a number of data fields and formats of data fields, and
the experimental dataset is a new or updated dataset of at least one of the one or more current datasets;
performing validation operations on the experimental dataset, wherein the validation operations include:
retrieving the encode values corresponding to the one or more current datasets; and
using the encode values to validate one or more characteristics of the experimental dataset; and
in response to a determination of success of the validation operations, generating a validation output permitting publication of the experimental dataset to the first and second live databases for updating or modification of the first and second live databases.

11. The non-transitory, computer-readable medium of claim 10, wherein the performing validation operations includes validating a value distribution associated with the experimental dataset.

12. The non-transitory, computer-readable medium of claim 11, wherein the performing encoding operations includes:
training an autoencoder machine learning model based on the one or more current datasets to generate a trained autoencoder model; and
calculating a first latent probability distribution across multiple data record keys corresponding to the one or more current datasets using the trained autoencoder model.

13. The non-transitory, computer-readable medium of claim 12, wherein the autoencoder machine learning model is a Deep Autoencoding Gaussian Mixture Model (DAGMM).

14. The non-transitory, computer-readable medium of claim 12, wherein the validating the value distribution associated with the experimental dataset includes validating numerical data in the experimental dataset, including by:
applying the trained autoencoder model to the experimental dataset to calculate a second latent probability distribution across multiple data record keys corresponding to the experimental dataset; and
comparing the first and second latent probability distributions.

15. The non-transitory, computer-readable medium of claim 10, wherein the performing validation operations includes validating a value format of string-type data included in the experimental dataset.

16. The non-transitory, computer-readable medium of claim 15, wherein the performing encoding operations includes:
generating one or more regular expressions based on string-type data included in at least one of the one or more current datasets; and
wherein the validating the value format of string-type data included in the experimental dataset includes parsing data in the experimental dataset using the one or more regular expressions.

17. A method, comprising:
performing validation operations on an experimental dataset from an experimental database at a non-production datacenter, wherein the validation operations include:
retrieving encode values corresponding to one or more current datasets, wherein the one or more current datasets are used by a first live database at a production datacenter and a second live database at the non-production datacenter, wherein the first live database uses the one or more current datasets to support a production version of a web service for client use, and wherein the second live database uses the one or more current datasets to perform analytics on the production version of the web service; and using the encode values to validate one or more characteristics of the experimental dataset; and in response to a determination that the experimental dataset passes the validation operations, storing the experimental dataset in the first and second live databases for updating or modification of the first and second live databases, wherein the one or more current datasets and the experimental dataset include data organized into multiple data records having values corresponding to multiple data fields, the one or more current datasets and the experimental dataset have respective dataset schemas, attributes of the dataset schemas include a number of data fields and formats of data fields, and the experimental dataset is a new or updated version of at least one of the one or more current datasets.

18. The method of claim 17, wherein the performing validation operations includes validating semantic values associated with one or more data records in the experimental dataset.

19. The method of claim 18, further comprising:

performing encoding operations using a natural language processing (NLP) model to calculate first vector word-embedding representations of data in the one or more current datasets; and wherein the validating the semantic values includes:

using the NLP model to calculate second vector word-embedding representations of data in the experimental dataset; and comparing the first vector word-embedding representations and second vector word-embedding representations.

20. The method of claim 17, wherein the performing validation operations includes validating an update pattern associated with one or more data records in the experimental dataset.

\* \* \* \* \*